United States Patent [19]

Vecchi

[11] 4,147,082
[45] Apr. 3, 1979

[54] ADJUSTABLE STOCK GUIDE

[76] Inventor: John C. Vecchi, 1603 Third St., Natrona Heights, Pa. 15065

[21] Appl. No.: 887,674

[22] Filed: Mar. 17, 1978

[51] Int. Cl.² .............................................. B65H 5/38
[52] U.S. Cl. .................................... 83/440.1; 83/444; 83/449
[58] Field of Search ...................... 83/440.1, 440, 444, 83/449

[56] References Cited

U.S. PATENT DOCUMENTS

| | | | |
|---|---|---|---|
| 1,288,416 | 12/1918 | Howell | 83/440 |
| 1,916,380 | 7/1933 | Leland | 83/444 X |

Primary Examiner—Frank T. Yost
Attorney, Agent, or Firm—Brown, Flick & Peckham

[57] ABSTRACT

A longitudinally adjustable stock guide is provided for installation between the entrance end of the bottom die support of a stamping or punch press and the adjacent side of the press. The guide includes upper and lower rows of horizontal rigid arms, with means pivotally connecting the arms in each row end to end on vertical axes. The arms extend back and forth in a zigzag configuration, with each arm in the lower row being directly below an arm in the upper row and spaced from it to form a slot between them. The outer ends of the arms at one end of the rows are adapted to be pivotally attached to the entrance end of a bottom die support, and the outer ends of the arms at the opposite ends of the rows are adapted to be pivotally attached to the press. The slots between the upper and lower rows of arms form a guide passage for stock that has entered the press.

7 Claims, 3 Drawing Figures

ADJUSTABLE STOCK GUIDE

In the use of stamping and punch presses a strip of sheet metal stock is fed into a press and between its upper and lower dies. The strip or stock is guided in various ways from its source of supply to the press, but since the bottom die support varies in length from one die set to another the gap between the end of the die support and the adjacent side of the press will also vary in length. To guide and support the stock as it travels across this gap it is usually the practice to bridge the gap with a stock guide. However, it has been necessary heretofore to provide stock guides of various lengths so that the one of proper length can be installed every time a die support of a different length is used. This is expensive and time consuming.

It is among the objects of this invention to provide a stock guide of relatively simple construction which is adjustable in length, which is quick and easy to adjust and which is easy to install.

Figure 1:
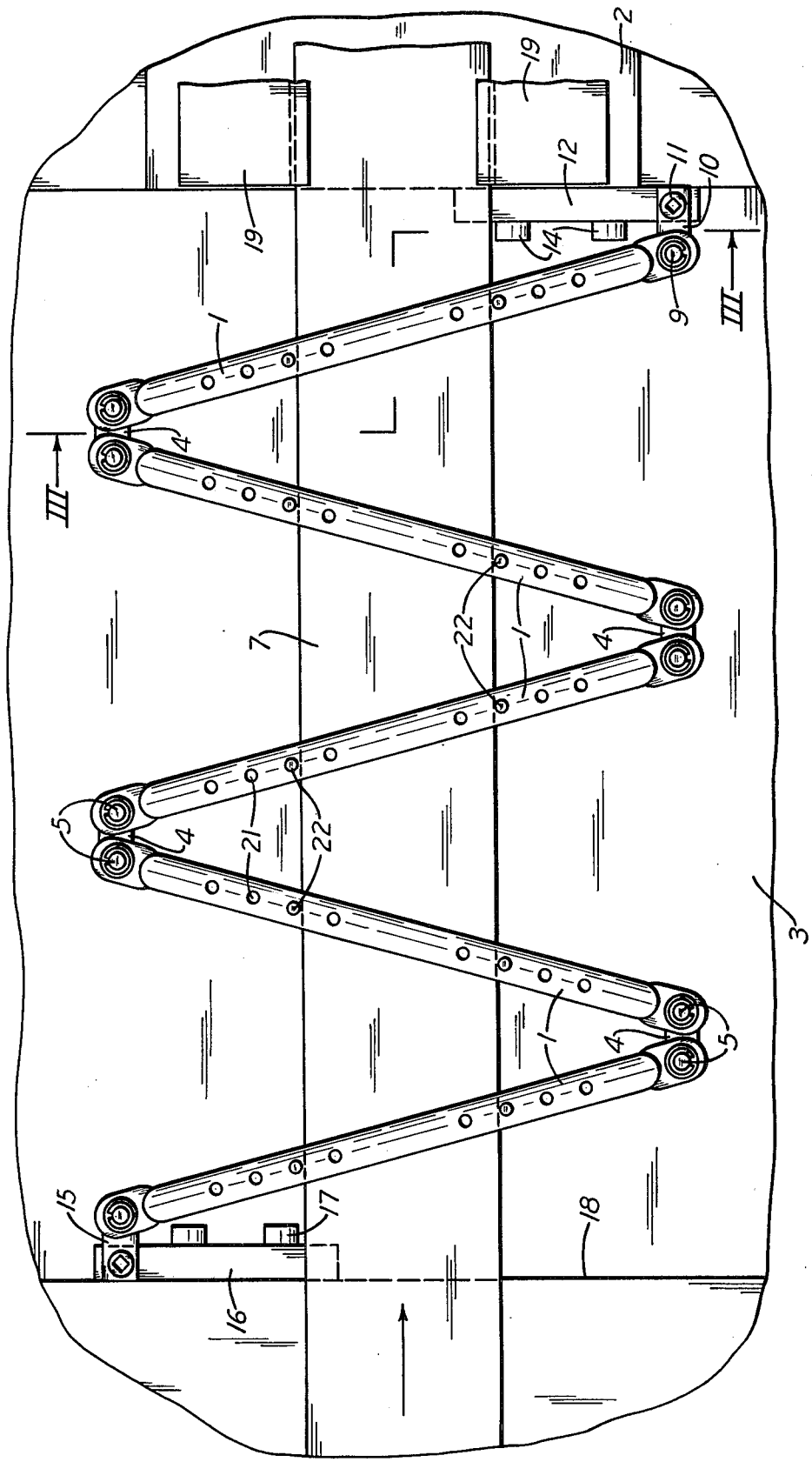
Figure 2:
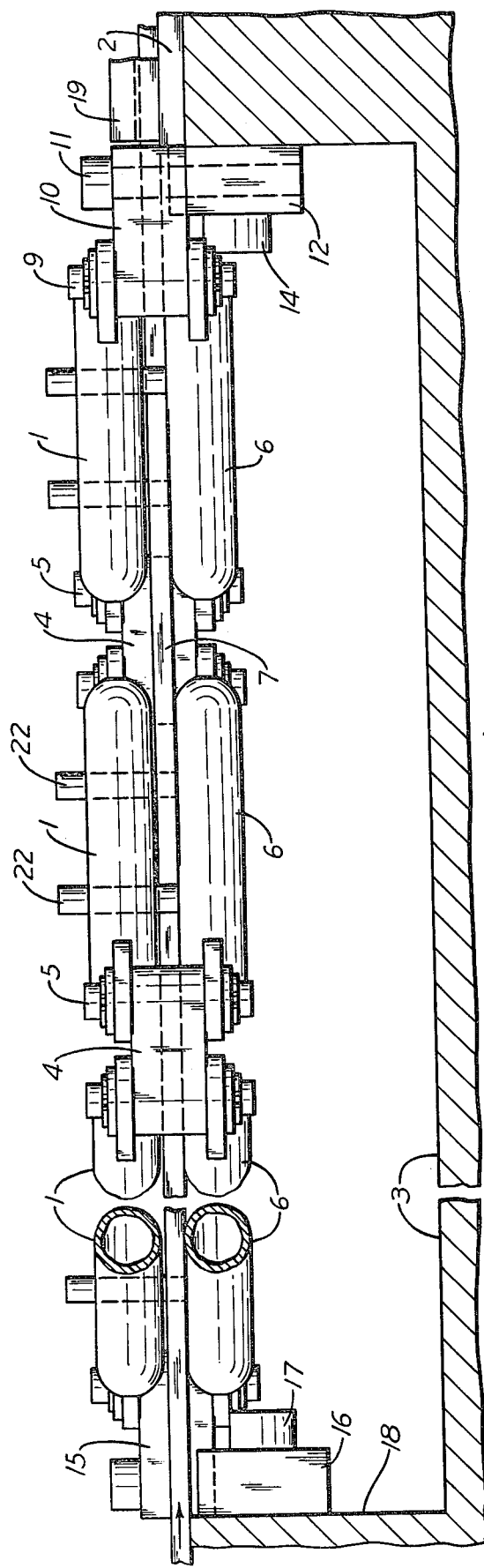
Figure 3:
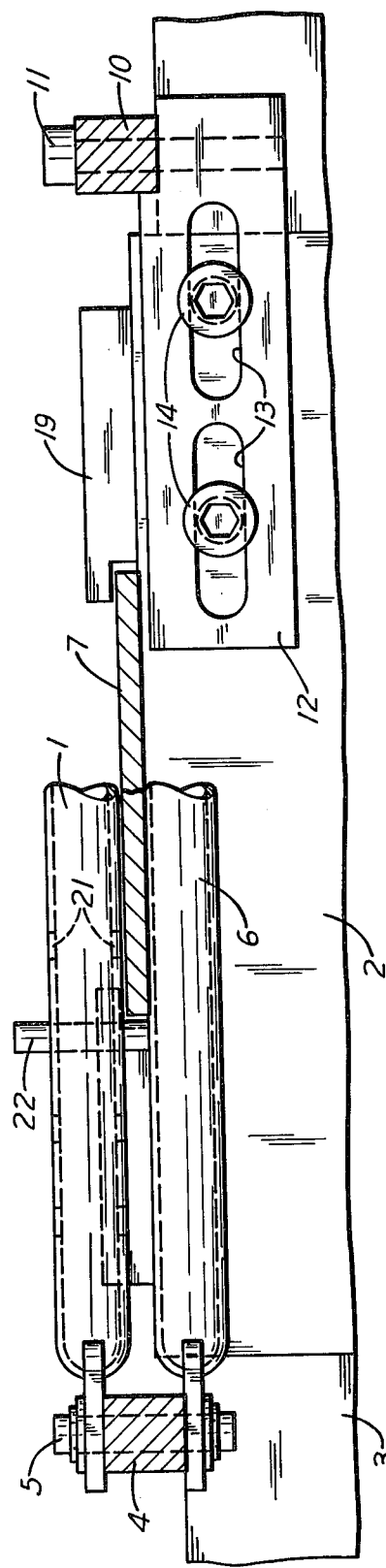

The preferred embodiment of the invention is illustrated in the accompanying drawings, in which FIG. 1 is a plan view;

FIG. 2 is an enlarged fragmentary side view, partly broken away in vertical section; and FIG. 3 is an enlarged vertical section taken on the line III—III of FIG. 1.

Referring to FIG. 1 of the drawings, a plurality of substantially horizontal rigid arms 1 are disposed end to end in a row between the entrance end of a support 2 for the bottom die of a stamping or punch press 3 and the adjacent side of the press. The arms extend back and forth in a zigzag pattern, with their ends pivotally connected end to end by means of short links 4 below them. Thus, each link is provided with a vertical opening through each end that receives a pivot pin 5 extending through the arm. As shown in FIGS. 2 and 3, ends of rigid arms 6 like arms 1 but forming a lower row are mounted on the lower ends of the pivot pins beneath the links, with each lower arm located directly below an arm in the upper row. Consequently, the links space the upper and lower rows of arms apart. The spaces between the two rows form a guide passage, through which stock 7 can travel toward the bottom die support as the stock is supported by the lower arms of the guide.

The outer ends of the arms 1 and 6 at one end of the two rows are pivotally connected by a pivot pin 9 to one end of a link between them, and the other end of the link is rigidly connected by a screw 11 to the top of a bar 12 extending laterally at right angles to the link. The end of the bar may be notched to receive the link in order to prevent it from turning relative to the bar. As shown in FIG. 3, the bar is provided with one or more horizontal passages 13 through it for receiving screws 14 to attach it to the entering end of the bottom die support 2. Preferably, the passages are in the form of slots that permit the bar to be adjusted lengthwise relative to the die support. A similar link 15 and bar 16 are connected to the outer ends of arms 1 and 6 at the opposite end of the rows, and this bar is attached by screws 17 to a vertical surface 18 of the press frame. The stock guide is supported by the end bars 12 and 16 at such a height that stock passing through the guide passage will feed straight into the usual guide 19 with which the bottom die support is provided.

The arms 1 and 6 that are illustrated are circular in cross section and can be made from pipes, the ends of which have been flattened and provided with holes for pivot pins 5. Arms having other cross sections also can be used, but it is preferred that their shape be such that the entrance to the space between each pair of arms 1 and 6 flares outwardly so that the front end of the entering stock will be guided into that space instead of possibly catching on an arm. Therefore, in addition to circular arms, hexagonal or octagonal arms can be used.

If it is desired to use the stock guide to also limit lateral movement of the stock travelling through it, at least some of the upper arms are each provided with at least two vertical holes 21 therethrough spaced apart a distance at least equal to the width of the stock. A pin 22 is inserted in each hole and rests on the arm below. These two pins prevent or limit lateral movement of the stock passing between them. By having several holes in each arm as shown, the width of the guide passage can be varied to suit stock of different widths.

When a die support is removed from the press, after disconnecting bar 12 from it, and a die support of a different length is installed, the stock guide just described can be lengthened or shortened sufficiently by pulling or pushing on its free inner end to move bar 12 into a position where it can be attached to the end of the new die support. This makes it unnecessary to have a different stock guide for each bottom die support of a different length.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A longitudinally adjustable stock guide for installation between the entrance end of the bottom die support of a stamping or punch press and the adjacent end of the press, said guide comprising upper and lower rows of substantially horizontal rigid arms, means pivotally connecting the arms in each row end to end on vertical axes with the arms extending back and forth in a zigzag configuration to thereby permit the length of the rows to be increased and decreased, each arm in the lower row being directly below an arm in the upper row and spaced therefrom to form a slot between them, means adapted to pivotally attach the outer ends of the arms at one end of said rows on a vertical axis to the entrance end of a bottom die support in a press, and means adapted to pivotally attach the outer ends of the arms at the opposite end of said rows on a vertical axis to the press, the slots between the upper and lower arms forming a guide passage for stock that has entered the press.

2. A longitudinally adjustable stock guide according to claim 1, in which said arms are round in cross section.

3. A longitudinally adjustable stock guide according to claim 1, in which said arms are hexagonal in cross section.

4. A longitudinally adjustable stock guide according to claim 1, in which said arms are octagonal in cross section.

5. A longitudinally adjustable stock guide according to claim 1, in which each of said connecting means includes a horizontal link and a pair of parallel vertical pivot pins extending through the ends of the link for connecting the ends of two arms in each row thereto, said link spacing the two upper arms from the two lower arms.

6. A longitudinally adjustable stock guide according to claim 1, in which each of said attaching means includes a horizontal link, a vertical pivot pin extending through one end of the link for connecting the outer ends of two arms thereto, a bar, and means fastening the opposite end of said link to one end of the bar, the bar extending laterally away from the link and being provided with a fastener-receiving passage therethrough for attaching the bar in place.

7. A longitudinally adjustable stock guide according to claim 1, in which each of at least some of said arms in the upper row is provided with vertical holes therethrough spaced lengthwise of the arm, and pins extend through said holes and across the underlying slot to restrict lateral movement of stock travelling through said guide passage.